United States Patent [19]

Waters et al.

[11] Patent Number: 5,572,589
[45] Date of Patent: Nov. 5, 1996

[54] DISC SERIALIZATION

[75] Inventors: Lester L. Waters, Bellevue; Jonathan D. Lazarus, Mercer Island, both of Wash.

[73] Assignee: Microsoft Corporation, Redmond, Wash.

[21] Appl. No.: 165,241

[22] Filed: Dec. 9, 1993

[51] Int. Cl.$^6$ ........................................ H04L 9/00
[52] U.S. Cl. ................................ 380/4; 380/25
[58] Field of Search .................. 380/4,23,25; 360/60; 358/403

[56] References Cited

U.S. PATENT DOCUMENTS

| | | | |
|---|---|---|---|
| 4,321,636 | 3/1982 | Lenz | 360/77 |
| 4,462,078 | 7/1984 | Ross | 380/4 |
| 4,577,289 | 5/1986 | Comerford et al. | 360/60 |
| 4,584,641 | 4/1986 | Guglielmino | 360/60 |
| 4,604,653 | 8/1986 | Shimizu | 358/403 |
| 4,608,618 | 8/1986 | Sturtevant-Stuart | 360/135 |
| 4,683,968 | 8/1987 | Appelbaum et al. | 380/4 |
| 4,685,055 | 8/1987 | Thomas | 364/200 |
| 4,734,796 | 5/1988 | Grynberg et al. | 360/60 |
| 4,757,534 | 7/1988 | Matyas et al. | 380/25 |
| 4,785,361 | 11/1988 | Brotby | 380/4 |
| 4,809,251 | 2/1989 | Collomby et al. | 369/32 |
| 4,955,008 | 9/1990 | Collomby et al. | 369/32 |
| 5,010,571 | 4/1991 | Katznelson | 380/4 |
| 5,027,396 | 6/1991 | Platteter et al. | 380/4 |
| 5,070,479 | 12/1991 | Nakagawa | 395/575 |
| 5,182,770 | 1/1993 | Medveczky et al. | 380/4 |
| 5,199,066 | 3/1993 | Logan | 380/4 |
| 5,295,187 | 5/1994 | Miyoshi | 380/4 |

FOREIGN PATENT DOCUMENTS

| | | |
|---|---|---|
| 0225259 | 6/1987 | European Pat. Off. . |
| 0549488 | 6/1993 | European Pat. Off. . |

*Primary Examiner*—Salvatore Cangialosi
*Attorney, Agent, or Firm*—Seed and Berry LLP

[57] ABSTRACT

Several approaches to serializing a disc may be used in the present invention. First, portions of a disc (such as sector(s) or track(s)) may be physically damaged to create a pattern of damage that somewhat uniquely identifies the disc. A number of different techniques may be used to damage the disc. For instance, laser devices may be used, sharp devices may be used or a master disc may be configured to create the damage. The physical damage may be used in conjunction with soft damage that is encoded in software on the disc. Alternatively, certain soft damage approaches may be used separately to serialize the disc.

25 Claims, 12 Drawing Sheets

DISC SERIALIZATION

TECHNICAL FIELD

The present invention relates generally to storage media for storing information and, more particularly, to serialization of disc storage media.

BACKGROUND OF THE INVENTION

Counterfeiting and piracy of software products and information stored on disc storage media has become a significant problem. The problem is especially acute for compact disc read-only memories (CD-ROMs). CD-ROMs are optical discs that stored data in a read-only format. One difficulty in identifying counterfeit CD-ROMs is the inability to distinguish between CD-ROMs that hold the same information. It is also difficult to determine whether a user is authorized to access a CD-ROM.

SUMMARY OF THE INVENTION

The present invention provides a method and system for minimizing counterfeiting of CD-ROMs and authenticating users of CD-ROMs. In accordance with the first aspect of the present invention, a method of serializing a disc involves physically damaging a portion of the disc to create a pattern of damage. The pattern of damage is encoded in an identifying value and the disc is marked with the identifying value to distinguish the disc from other discs. Alternatively, the pattern of damage may be encoded in a first value that is combined with a second value to produce a combined value. The combined value is then encrypted to produce the identifying value that is marked on the disc.

In accordance with another aspect of the present invention, a portion of a first disc is physically damaged to create a first pattern of damage. The first disc is marked with a first identifying value that holds information encoding the first pattern of damage. A portion of a second disc is also physically damaged to create a second pattern of damage that differs from the first pattern of damage. A second disc is marked with a second identifying value that encodes the second pattern of damage. The identifying values help to distinguish between the two discs.

In accordance with a further aspect of the present invention, at least one sector in a predetermined group of sectors on a disc is physically damaged. An identifying value is generated that encodes which of the sectors in the predetermined group of sectors have been damaged. The disc is marked with the identifying value so that the disc may be distinguished from other discs.

In accordance with a still further aspect of the present invention, at least one track on the predetermined groups of tracks is physically damaged on a disc. An identifying value is generated. The identifying value holds information that encodes which of the tracks in the predetermined groups of tracks have been damaged in the damaging step. A disc is marked with the identifying value so that disc may be distinguished from other discs.

In accordance with an additional aspect of the present invention, an optical disc includes a read-only portion and a writeable region. The optical disc is serialized by storing data in a read-only format in the read-only portion of the disc and storing a serial number in the writeable portion of the disc to distinguish the optical disc from other optical discs.

BRIEF DESCRIPTION OF THE DRAWINGS

A preferred embodiment of the present invention will be described in more detail below with reference to the following drawings.

DETAILED DESCRIPTION OF THE INVENTION

The preferred embodiment of the present invention provides a number of approaches for serializing optical discs so as to be able to distinguish among optical discs holding the same data. The preferred embodiment of the present invention described herein also provides an approach to authenticating such serialized optical discs. The serialization of the optical discs and the authentication strategy help to minimize counterfeiting and piracy of the information contained on the optical discs.

Although the preferred embodiment of the present invention will be described with reference to CD-ROMs, those skilled in the art will appreciate that the present invention may also be applied to other types of disc storage media, including magnetic discs. These other types of media may include writeable media rather than solely read only media. Moreover, the present invention may be applied to audio CDs, video discs and other disc storage media.

Figure 1:
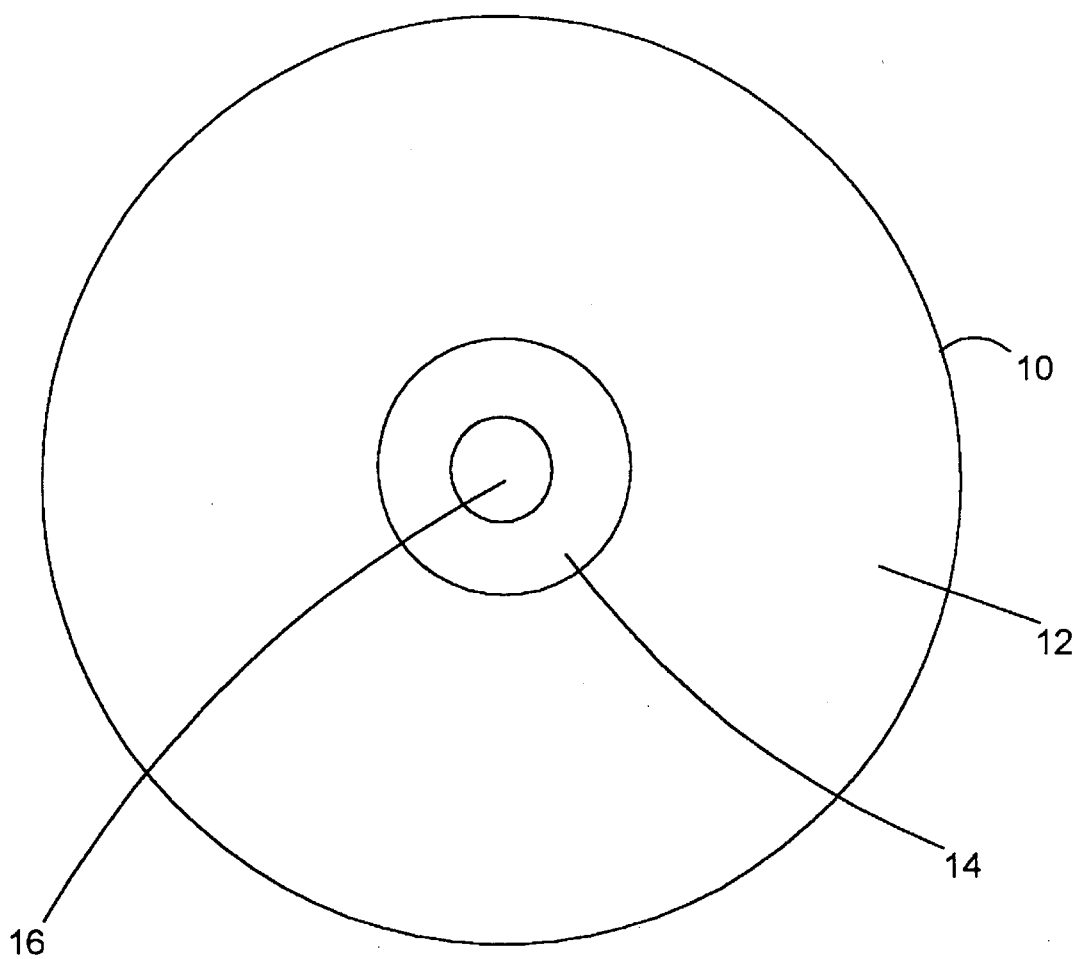
FIG. 1 is a diagram of an example CD-ROM disc.

FIG. 1 is a diagram of an example CD-ROM 10. The CD-ROM 10 includes a data area 12 for recording data in a read-only format. The data area 12 typically has a metallic film coating. The CD-ROM 10 also includes a hub 14 that does not have any film deposited on it. The hub 14 includes only the plastic substrate on which the metallic film is deposited. The hub 14 includes a spindle hole 16 through which a spindle passes when the CD-ROM 10 is played or accessed.

Figure 2:
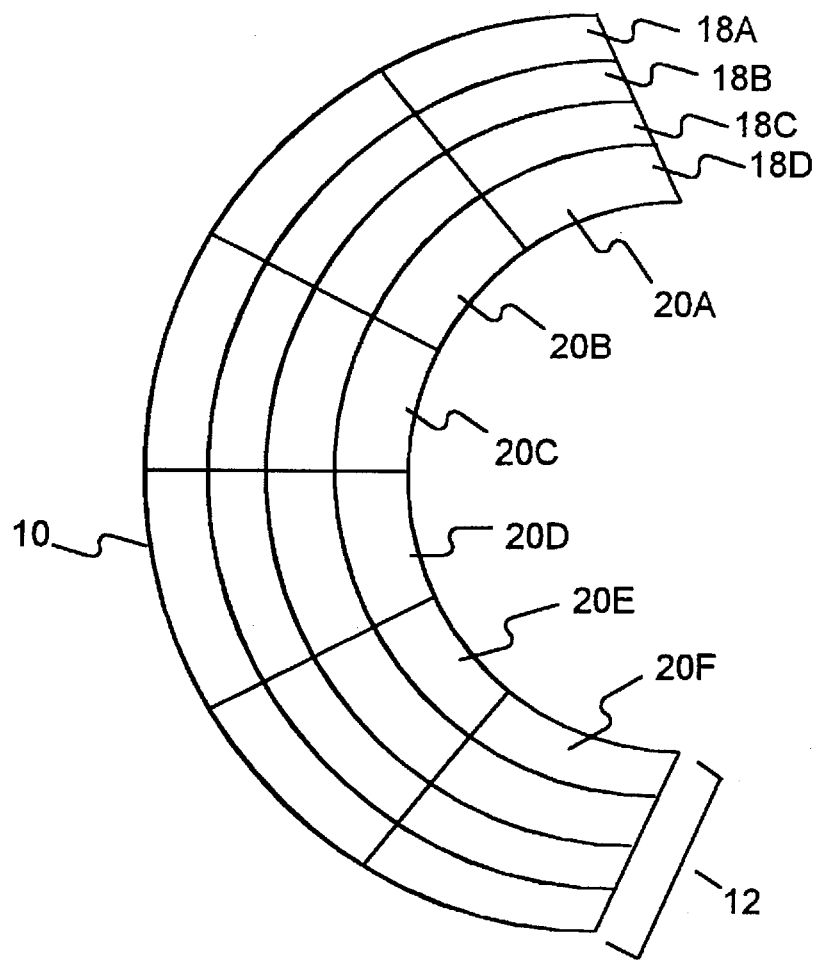
FIG. 2 is a diagram illustrating a portion of the tracks of a CD-ROM disc that includes sectors.

FIG. 2 is a diagram of a portion of CD-ROM 10. Like a magnetic disc, the data area 12 of the CD-ROM 10 includes a number of regions. In particular, the data area 12 includes a number of concentric tracks 18A, 18B, 18C and 18D that may hold data. Each of the tracks may be further radially subdivided into sectors. For example, as shown in FIG. 2, track 18D includes sectors 20A, 20B, 20C, 20D, 20E, and 20F. The reference numbers assigned to the sectors are not intended to correspond with the sector numbers of the sectors.

Figure 3:
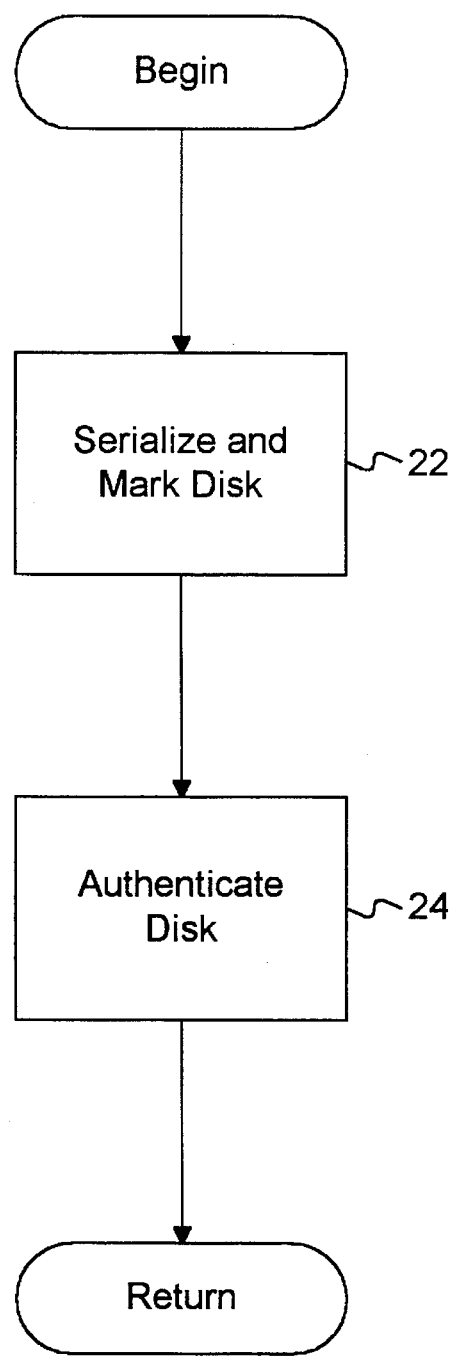
FIG. 3 is a flow chart of steps performed by the preferred embodiment of the present invention to serialize and authenticate a CD-ROM disc.

FIG. 3 is a high level flow chart of the steps performed by the preferred embodiment of the present invention described herein. Each CD-ROM in a group of CD-ROMs holding the same information is assigned an identifying value, such as a serial number, that is marked on the disc (step 22). Identifying values are assigned to the discs to differentiate among the discs. Each identifying value need not be totally unique but rather may be partially unique (such as 1 in 1000 unique) relative to identifying values assigned to other CD-ROMs. Different techniques for serializing CD-ROMs will be described in more detail below. The identifying values may be assigned on a number of different bases, including a random, pseudorandom or sequential basis. The identifying values are utilized when a user requests access to the contents of a CD-ROM. The CD-ROM must be authenticated to insure that he has a valid CD-ROM, and that the user is a validated user (step 24). If the disc is an authenticated CD-ROM and the user is a valid user, the user is granted access to the contents of the CD-ROM. The details of serialization and authentication will be provided below.

Figure 4A:
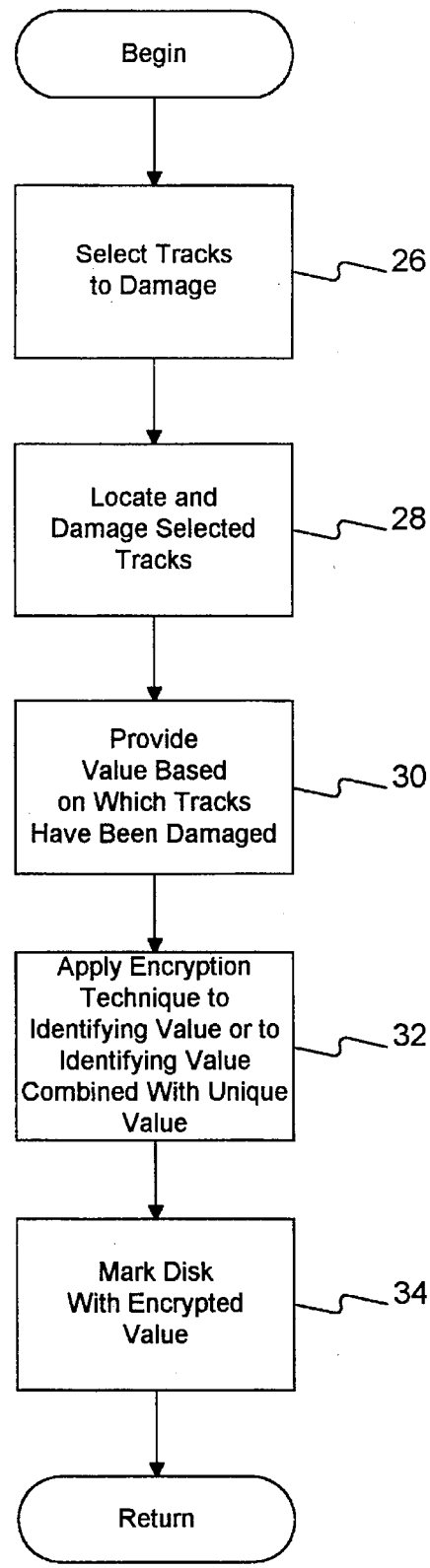
FIG. 4A is a flow chart illustrating the steps performed by a first approach to serializing disc in the preferred embodiment of the present invention.
Figure 4B:
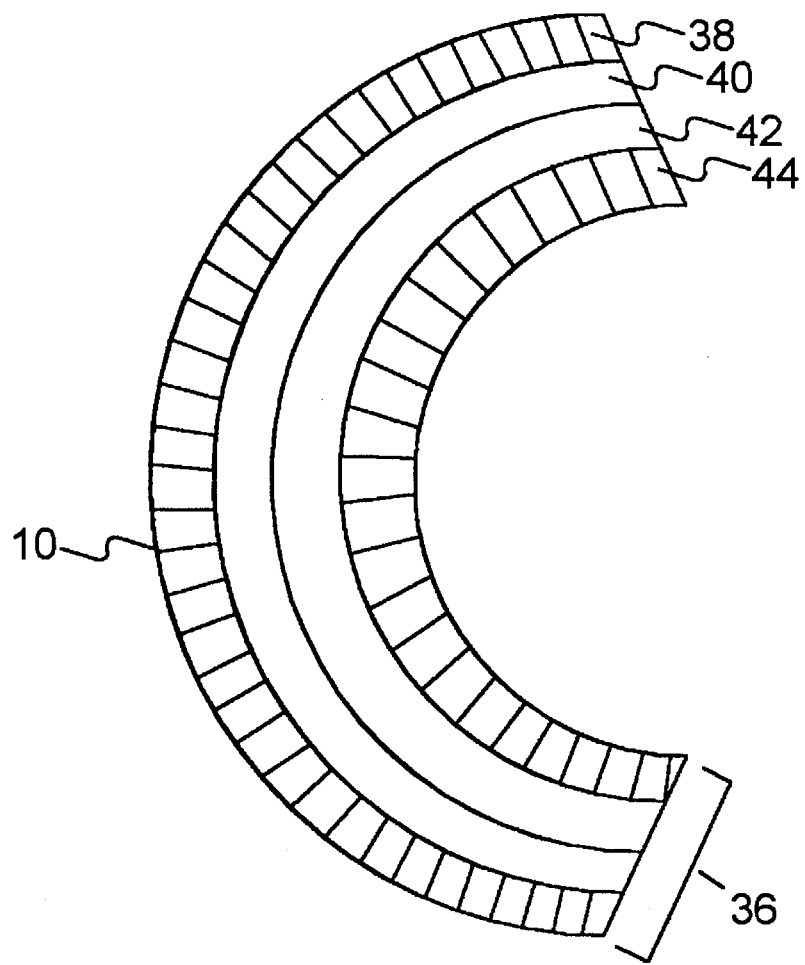
FIG. 4B is an example of a portion of a disc that is damaged using the technique of FIG. 4A.

As mentioned above, there are a number of different techniques in the preferred embodiment of the present invention for serializing a CD-ROM 10. A first approach to serializing a CD-ROM 10 in the preferred embodiment of the present invention will be described with reference to FIGS. 4A and 4B. FIG. 4A is a flow chart illustrating the steps performed by this technique. This serialization technique involves physically damaging tracks on the CD-ROM 10. Initially, the tracks to be damaged must be selected (step 26). A predetermined group of tracks on the CD-ROM are specified as those that may be damaged so as to serialize the disc. In the preferred embodiment of the present invention described herein, this group of tracks comprises a group of the outermost tracks on the CD-ROM 10. In FIG. 4B, which shows a portion of a CD-ROM 10, the predetermined group of tracks is designated by reference numeral 36 and includes tracks 38, 40, 42 and 44.

The selection of the tracks to be damaged depends upon how the resulting pattern of physical damage is to be encoded into an identifying value. One approach is for each of the tracks in the predetermined group of tracks 36 to be associated with a given bit position in the identifying value. For instance, track 38 is associated with a first bit position; track 40 is associated with a second bit position; track 42 is associated with a third bit position; and track 44 is associated with a fourth bit position. A damaged track is encoded as a first binary value (e.g., "1") and a non-damaged track is encoded as another binary value (e.g., "0"). The values assigned for a damaged track versus a non-damaged track may also be reversed (i.e., a "0" is assigned for a damaged track and a "1" is assigned for a non-damaged track). The tracks to be damaged may be located by either measuring from the inside diameter or by looking for a specific track or sector number.

Once the tracks to be damaged have been selected, they are physically damaged to create the pattern of damage that encodes the desired identifying value. The pattern of damage is created such that it is detectable by a conventional CD-reader device. Those skilled in the art will appreciate that numerous techniques for physically damaging the tracks may be used. Once technique is to use a laser to selectively damage the tracks. Those skilled in the art will appreciate that different laser devices may be utilized to inflict such damage and that different wavelengths of laser light may be used to inflict such damage. Further, other means for physically damaging the CD-ROM may be used. For example, the surface of the CD-ROM may be scratched with a sharp instrument. Another alternative is to directly manipulate the masters that are used to produce the CD-ROMs, so that the CD-ROMs are produced with the desired pattern of damage. FIG. 4B illustrates an instance wherein track 38 and track 44 have been damaged by a laser device (note they are shaded), whereas tracks 40 and 42 have not been damaged (note they are not shaded).

In attempting to locate the tracks to be damaged, it is advantageous to measure from the outside circumference of plastic film on the CD-ROM 10 inward. The tracks on the CD-ROM have eccentricities so that they are not perfectly round. Measuring from the hub outward to the tracks to be damaged increases the error in the measurement due to eccentricities. On the other hand, measuring from the outer edge of the film deposited on the substrate minimizes the error due to the eccentricities because the tracks to be damaged are much closer to the outside of the CD-ROM 10. Less error is accumulated in the measurement from the outside of the CD-ROM 10 and measuring is far faster than reading each track in succession until the desired track is found.

Once the selected tracks have been physically damaged (i.e., step 28 has been performed), the identifying value is known, based upon which tracks have been damaged and based upon the encoding scheme that has been adopted (step 30). FIG. 4B illustrates an instance wherein using the above-described encoding scheme, the identifying value is "1001". Those skilled in the art will appreciate that other encoding schemes may be employed in the present invention. To prevent potential counterfeiters from determining the relationship between the physical damage and the identifying value, the identifying value is encrypted or alternatively, the identifying value is combined with another unique value (such as date, time or sequence number) to create a composite value that is cryptographically signed and/or sealed (step 32). Those skilled in the art will appreciate that various different encrypting schemes may be utilized. In the preferred embodiment of the present invention, the identifying value is encrypted using an encryption strategy, such as RSA or DES. The hub 14 (FIG. 1) of the disc 10 is then marked with the encrypted identifying value or composite valve (step 34). The encrypted identifying value or composite value may be marked on the hub using an ink jet or other suitable marking mechanism. Preferably, the encrypted identifying value or composite value is legible to a human viewer that examines the disc (i.e., the value marked on the hub is of the appropriate size to be legible to a viewer and is written in alphabet that is comprehensible to a viewer).

Figure 5A:
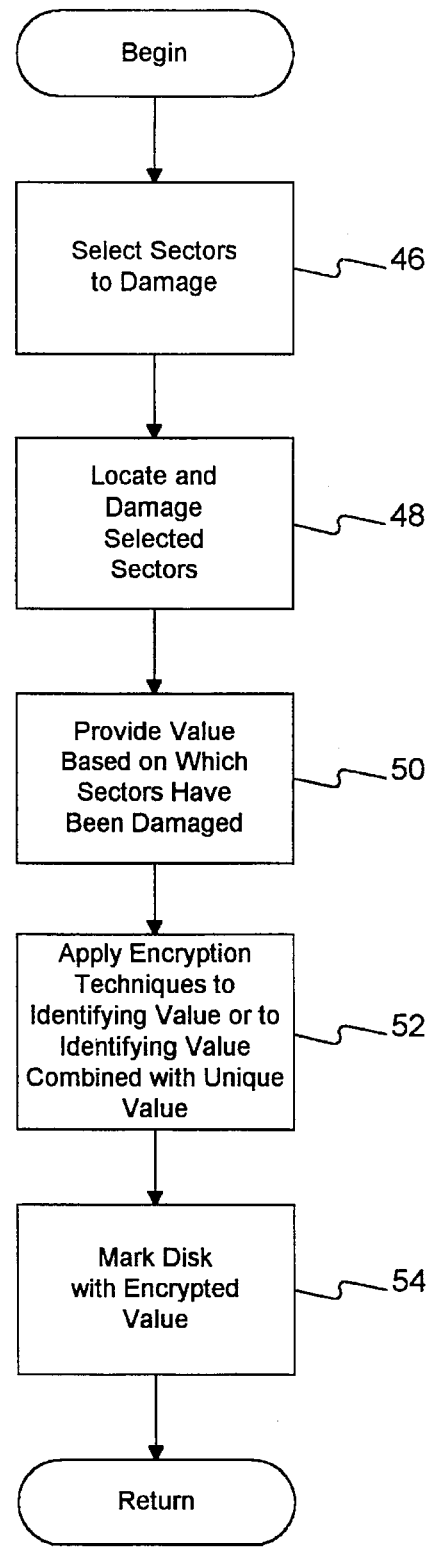
FIG. 5A is a flow chart of the steps performed by a second approach to serializing discs in the preferred embodiment of the present invention.
Figure 5B:
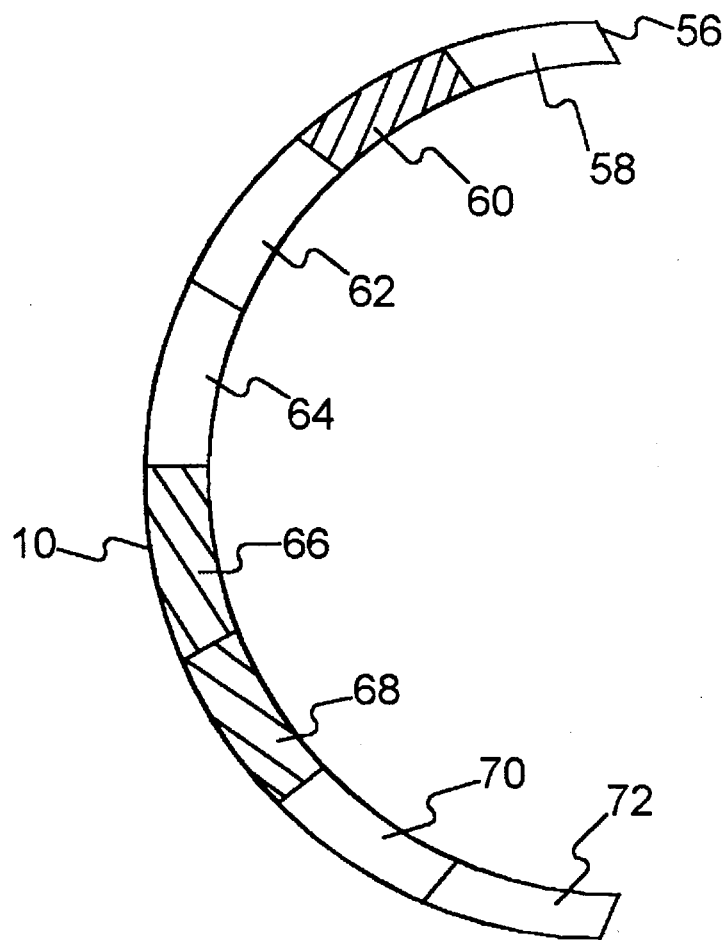
FIG. 5B is an illustration of a track of a CD-ROM disc that is damaged in accordance with the approach of FIG. 5A.

Another approach for serializing CD-ROMs in accordance with the preferred embodiment of the present invention is to selectively damage sectors of CD-ROMs. FIG. 5A is a flow chart of the steps performed in such an approach. The CD-ROM 10 (FIG. 5B) includes a predetermined track or tracks holding sectors that may be damaged to encode the serial number. In the example shown in FIG. 5B, a single track 56 includes sectors 58, 60, 62, 64, 66, 68, 70, and 72 that may be damaged to encode the identifying value. Given knowledge of the identifying value to be assigned to the CD-ROM 10, the sectors to be damaged are selected (step 46 in FIG. 5A). These sectors are then damaged utilizing a suitable mechanism, such as a laser device or other mechanism as described above, including manipulating the masters that are used to produce the CD-ROMs (step 48). A value that encodes the pattern of damage is then provided based upon which sectors have been damaged (step 50).

In the preferred embodiment of the present invention described herein, each of the sectors 58, 60, 62, 64, 66, 68, 70, and 72 is associated with a bit position in the calculated value. A damaged sector is associated with a first binary value and a non-damaged sector is associated with a second binary value. Suppose that damaged sectors are encoded as a "1" binary value and non-damaged sectors are encoded as a "0" binary value. Further suppose that sectors 60, 66 and 68 in FIG. 5B have been damaged (note that they are shaded), while sectors 58, 62 64, 70 and 72 have not been damaged (note that they are not shaded). In such a case, the pattern of damage illustrated in FIG. 5B encodes an identifying value of "01001100".

Unfortunately, the calculated value is not secure against potential counterfeiters. As a result, the identifying value is encrypted using an encryption strategy, such RSA or DES, or, as described above with reference to FIG. 4A, the identifying value is combined with a unique value to create a composite value that is encrypted (step 52). The hub 14 (FIG. 1) of the CD-ROM 10 is then marked with the encrypted identifying or composite value (step 54 in FIG. 5A). An ink jet or other mechanism may be utilizing to mark the hub. Moreover, those skilled in the art will appreciate that the mark may be applied to places other than the hub of the disc.

Figure 6A:
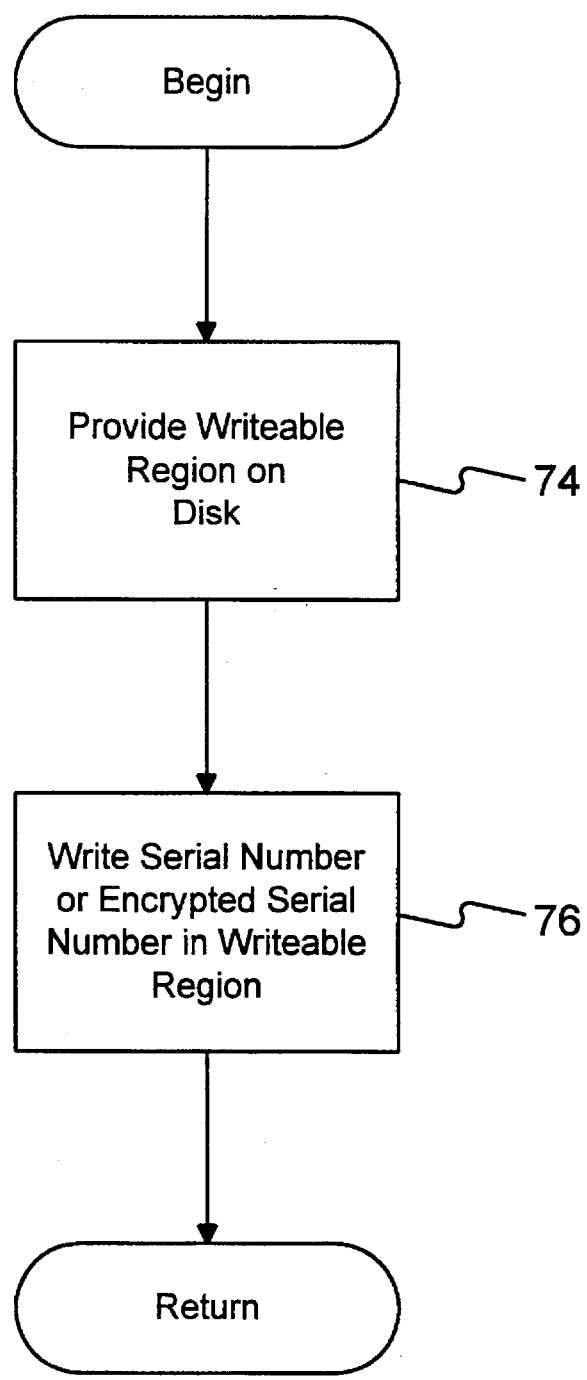
FIG. 6A is a flow chart illustrating the steps performed in a third approach to serializing discs in the preferred embodiment of the present invention.
Figure 6B:
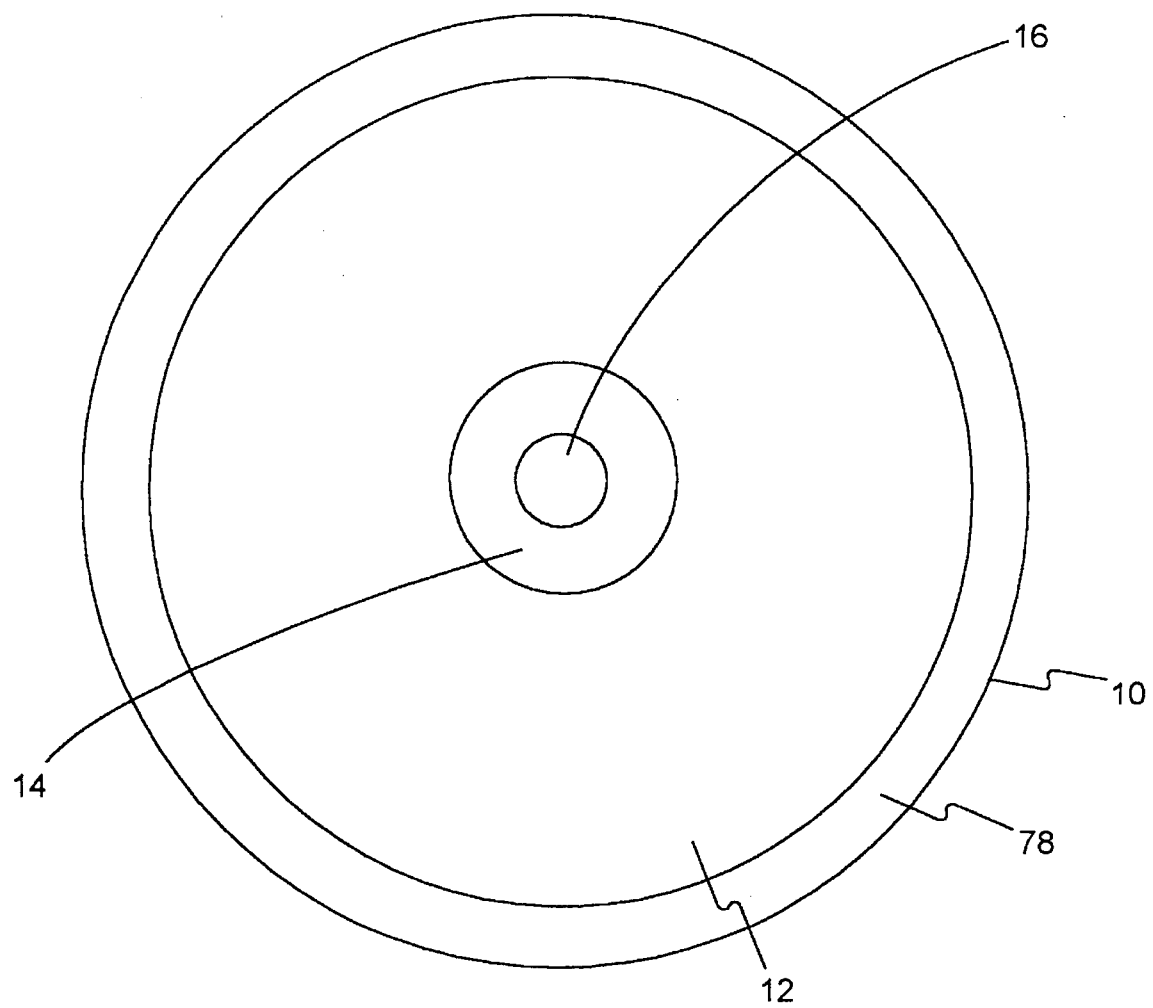
FIG. 6B is a diagram of a disc used in the approach of FIG. 6A.

Another approach to serializing CD-ROMs that is envisioned within the preferred embodiment of the present invention described herein, is to provide a writeable strip on the CD-ROM 10 that is used to hold a serialized identifying value. FIG. 6A is a flow chart showing the steps performed in this approach to serializing CD-ROMs. As is seen in FIG. 6A, in this approach, a writeable region is provided on each CD-ROM (step 74). In FIG. 6B, the writeable region 78 is positioned at the outermost tracks of CD-ROM 10. An identifying value is then written using conventional techniques on the writeable region 78 (step 76 of FIG. 6A). This identifying value may be a cryptographic signature as described above for the other serialization approaches. Each CD-ROM 10, thus, carries a unique identifying value that distinguishes it from other CD-ROMs that hold the same data.

Figure 7:
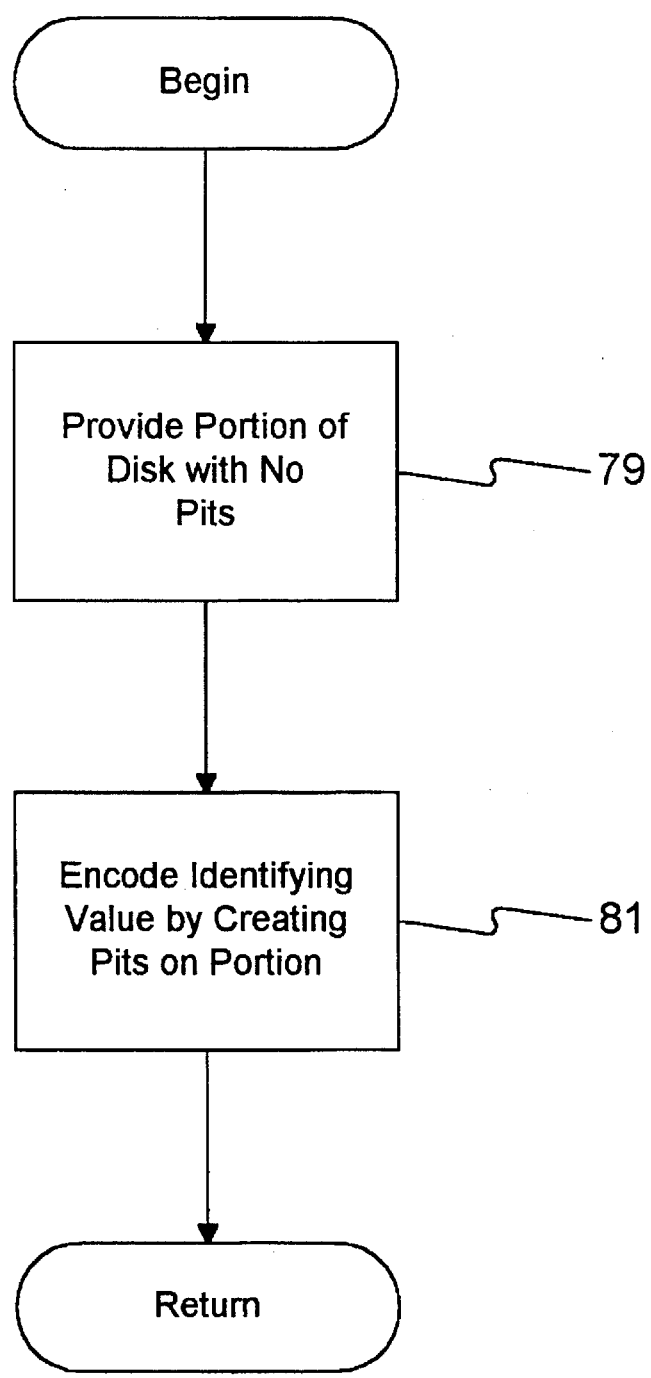
FIG. 7 is a flow chart illustrating the steps performed in a fourth approach to serializing discs in the preferred embodiment of the present invention.

FIG. 7 shows a flow chart of the steps that may be performed in another approach for serializing CD-ROMs in accordance with the preferred embodiment of the present invention. Each CD-ROM includes a portion, such as a track or a sector, that has no pits stamped into its plastic substrate (step 79). The pits are used to encode bit values within the CD-ROM 10. On a per CD-ROM basis, the identifying information is encoded in the specified portion of the CD-ROM using a laser or other suitable device to create pits that correspond with the identifying value (step 81). The laser device has to be of a different wavelength than that used to read the CD-ROM. Once the pits are written onto the CD-ROM, the identifying value may be read from the CD-ROM like other data on the CD-ROM. Each CD-ROM in a sequence of CD-ROMs holding the same data has its identifying value written on it in such a fashion. The identifying value may also be applied to the hub of the disc using ink jet or other suitable means.

Once all of the CD-ROMs in a group holding the same data are serialized, a CD-ROM may fall into the possession of customers or other users who wish to access the contents of the CD-ROMs. The preferred embodiment of the present invention described herein provides an authentication approach for insuring that the users are authenticated users and are not utilizing counterfeit copies of the CD-ROMs. When a user wishes to access the contents of the CD-ROMs, he may be required to contact a clearinghouse. The use of the clearinghouse is optional and provides another strategy for catching counterfeiters.

Figure 8:
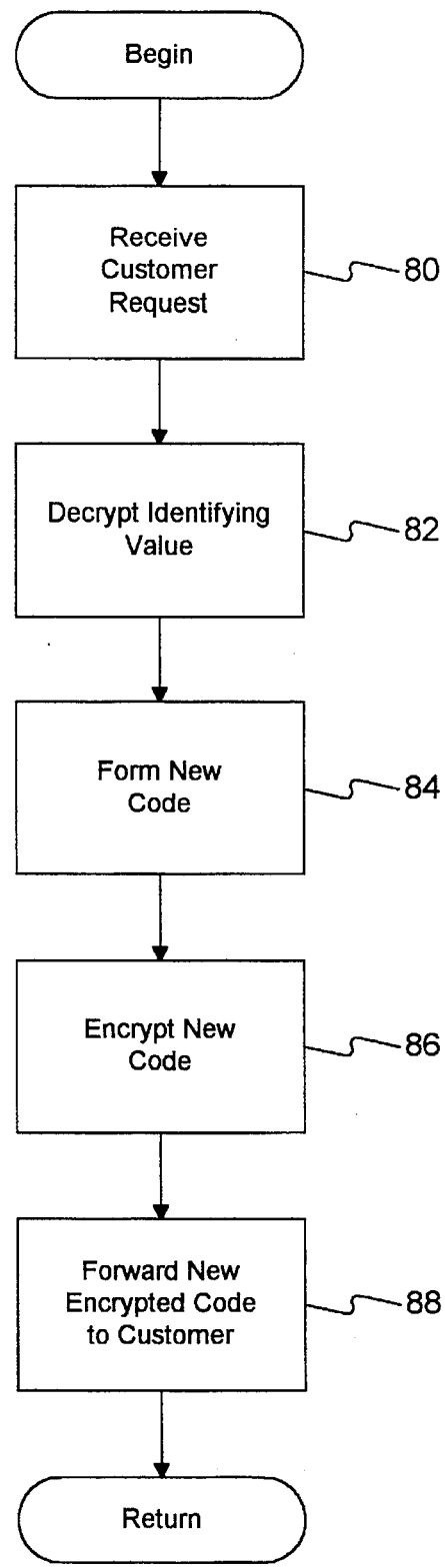
FIG. 8 is the flow chart of steps performed by a clearinghouse in an authentication approach of the preferred embodiment of the present invention.

FIG. 8 is a flow chart of the steps performed by the clearinghouse (when used) to authenticate that the user is a authenticated user and that the disc is a non-counterfeit disc. Initially, the user must contact the clearinghouse and request information that will enable him to access the contents of the CD-ROM 10. Included in the users request are the users name, company name, and the encrypted identifying value that is marked on the hub of the CD-ROM 10. Alternatively, if a clearinghouse is not used, the customer's request may be a registration card or which the user provides his name, company name and the number printed on the CD-ROM 10. When a clearinghouse is used, the clearinghouse receives the encrypted identifying value and decrypts the value (step 82). The decrypted identifying value specifies the pattern of damage for the CD-ROM 10, as discussed above. If the clearinghouse receives an excessive number of users that provide the same encrypted identifying value, the clearinghouse then knows that the CD-ROMs are likely counterfeit. The clearinghouse then assigns the user a unique I.D. and combines this unique I.D. with the decrypted identifying value. The new value is assigned so that a check value of the user name and company name can be extracted from the new code.

The new code is then encrypted (step 86) and forwarded to the user (step 88). For instance, the clearinghouse may verbally communicate the new encrypted code to the customer via telephone. If the customer is an authenticated customer, he will be able to obtain an appropriate key for decrypting the contents of the disc from the new encrypted code that has been provided to him by the clearinghouse.

Figure 9:
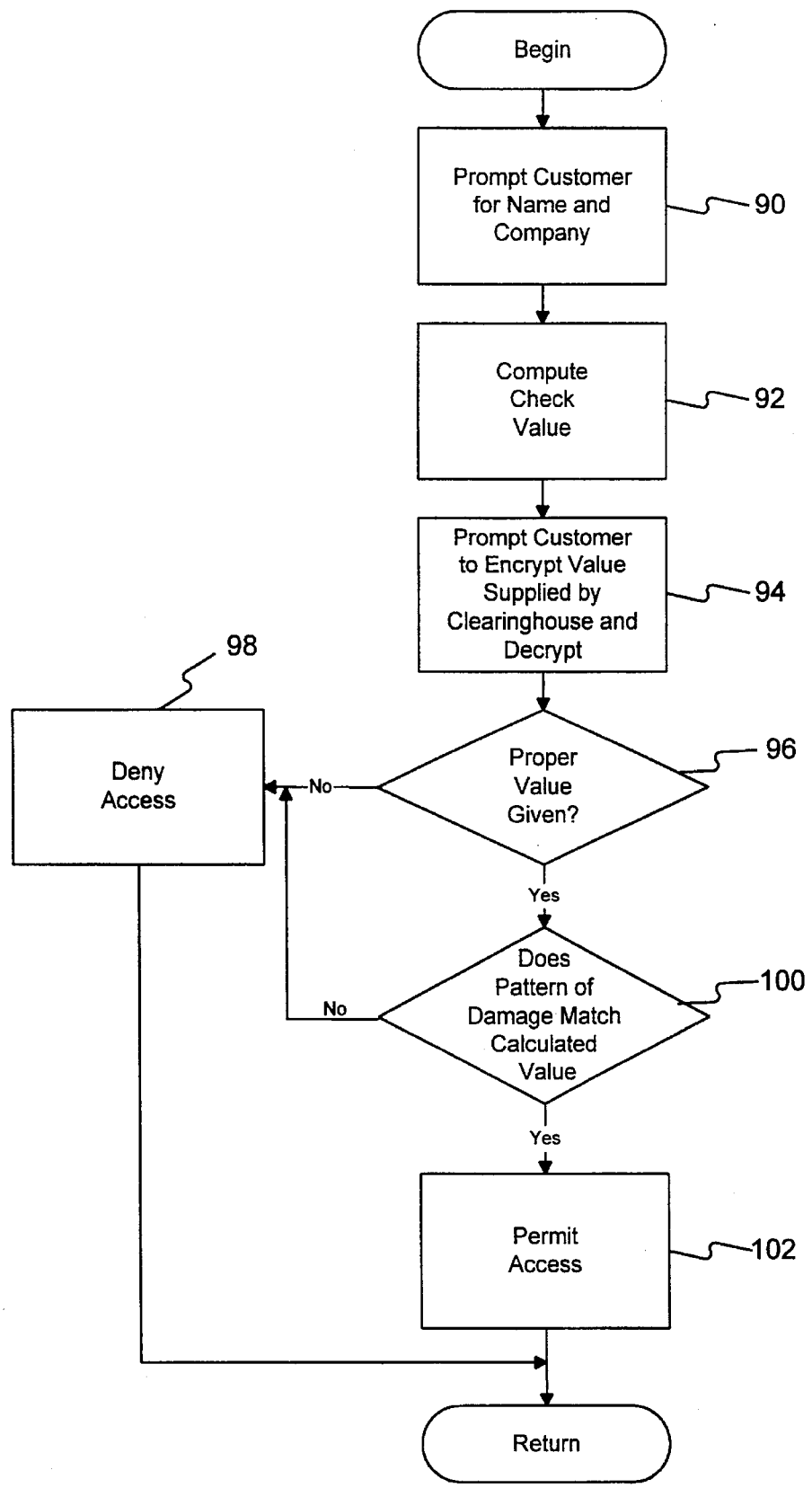
FIG. 9 is a flow chart of the steps performed by a set-up program in the authentication approach of the preferred embodiment of the present invention.

The CD-ROM 10 (FIG. 1) may include an optional set-up program. The set-up program is responsible for determining whether the user should be granted access to the CD-ROM 10. When a user seeks to access the contents of the CD-ROM 10, the set-up program begins to execute. FIG. 9 is a flow chart of the steps performed by the set-up program. Initially, the set-up program prompts the customer for his name and company (step 90). The set-up program then computes a check value, such as a cryptographic signature or message digest from the customers name and the company name (step 92). This check value is used later in the authentication process, as described below. The set-up program then prompts the customer for the new encrypted code that is supplied by the clearinghouse, and the set-up program decrypts the encrypted new code (step 94). The new decrypted code should include a check value of the customers name and the company, as well as a value encoding the pattern of damage on the CD-ROM 10. If the new decrypted code does not include such information, the set-up program denies the user access to the contents of the CD-ROM. In step 96, the set-up program extracts the check value of the customers name and the company name and compares the check value with the check value computed in step 92 to insure that the check values are equal (step 96). If the check values are not equal (i.e., the proper value was not given), the user is denied access to the contents of the CD-ROM.

On the other hand, if the check values are equal, step 100 is performed. In step 100, the set-up program checks whether the pattern of damage on the CD-ROM matches the value extracted from the new decrypted code. The pattern of damage on the CD-ROM may be calculated by attempting to read each of the tracks/sectors in the predetermined group of tracks/sectors that may be damaged. Damaged tracks/sectors produce an error code that identifies them. Alternatively, the pattern of damage may be detected by an optical detector. The damage of tracks or sectors is visible to optical detectors and can be used to encode the pattern of damage in a bar code-like fashion. In the instance where an additional writeable region is provided on the CD-ROM (such as shown in FIG. 6B), the pattern of damage is calculated by reading the identifying value off the writeable region. If the pattern of damage matches the value extracted from the information provided by the user, the user is granted access to the contents of the CD-ROM (step 102). If there is no such match, the user is denied access to the contents of the CD-ROM (step 98). The contents of the CD-ROM are preferably compressed and encrypted. In step 102, to grant the user access to the contents of the CD-ROM, the set-up program decompresses and decrypts the contents of the CD-ROM.

While the present invention has been described with reference to a preferred embodiment thereof, those skilled in the art will appreciate the various changes in form and detail may be made without departing from the scope of the present invention as defined in the appended claims. For instance, the techniques described above may be adopted to both magnetic and optical disc media, and the disc may be damaged using devices other than laser devices.

We claim:

1. A method of serializing a read-only optical disc comprising the steps of:

physically damaging a portion of the optical disc to create a pattern of damage;

encoding the pattern of damage in an identifying value to distinguish the optical disc from other optical discs;

encrypting the identifying value; and marking the optical disc with the encrypted value.

2. The method of claim 1 wherein the step of physically damaging the portion of the optical disc to create the pattern of damage further comprises the step of using a laser device to physically damage the portion of the optical disc to create the pattern of damage.

3. The method of claim 2, further comprising the step of encoding values on the optical disc that indicate that a portion of the optical disc is bad.

4. The method of claim 1 wherein the optical disc includes tracks and wherein the step of physically damaging the portion of the optical disc to create the pattern of damage further comprises the step of physically damaging at least one track of the optical disc to create the pattern of damage.

5. The method of claim 4, further comprising the step of encoding values on the optical disc that indicate that a portion of the optical disc is bad.

6. The method of claim 3 wherein the step of encoding the pattern of damage in the identifying value further comprises the step of encoding in the identifying value which tracks have been damaged by the physically damaging step.

7. The method of claim 1 wherein the optical disc includes sectors and wherein the step of physically damaging the portion of the optical disc to create the pattern of damage further comprises the step of physically damaging at least one sector of the optical disc.

8. The method of claim 7 wherein the step of encoding the pattern of damage in the identifying value further comprises the step of encoding which of the sectors has been damaged by the damaging step in the identifying value.

9. The method of claim 1 wherein the optical disc includes a hub and wherein the step of marking the optical disc with the encrypted value further comprises the step of marking the hub of the optical disc with the encrypted value.

10. The method of claim 1, further comprising the step of using an optical detector to discern the pattern of damage on the optical disc.

11. The method of claim 1, further comprising the step of reading the optical disc to discern the pattern of damage on the optical disc.

12. The method of claim 1 wherein the step of physically damaging the portion of the optical disc to create the pattern of damage further comprises the steps of:

providing a master for producing the optical disc, the master being constructed to produce the optical disc with the pattern of damage; and producing the optical disc with the pattern of damage using the master.

13. The method of claim 10, wherein the step of physically damaging the portion of the optical disc comprises the step of physically damaging a portion of the optical disc using a laser device.

14. The method of claim 12 wherein the step of physically damaging the portion of the optical disc comprises the step of physically damaging at least one track of the optical disc.

15. A method of serializing a first optical disc and a second optical disc, comprising the steps of:

physically damaging a portion of the first optical disc to create a first pattern of damage;

generating a first identifying value that encodes the first pattern of damage;

encrypting the first identifying value;

marking the first optical disc with the encrypted first identifying value;

Physically damaging a portion of the second optical disc to create a second pattern of damage that differs from the first pattern of damage;

generating a second identifying value that encodes the second pattern of damage, the identifying values of the first optical disc and the second optical disc for distinguishing the first optical disc from the second optical disc;

encrypting the second identifying value; and marking the second optical disc with the encrypted second identifying value.

16. The method of claim 15 wherein the step of physically damaging the portion of the first optical disc to create the first pattern of damage further comprises the step of using a laser device to damage the portion of the first optical disc to create the first pattern of damage.

17. The method of claim 15 wherein the step of physically damaging the portion of the second optical disc to create the second pattern of damage further comprises the step of using a laser device to physically damage the portion of the second optical disc to create the second pattern of damage.

18. An optical disc comprising:

a physically damaged portion that is damaged to create a pattern of damage on the optical disc;

a non-damaged portion for storing data in a read-only format; and an encrypted value marker that encrypts an identifying value for distinguishing the optical disc from other optical discs, wherein said identifying value encodes the pattern of damage in the physically damaged portion.

19. The optical disc of claim 18 wherein the physically damaged portion comprises a plurality of tracks, some of which are damaged to create the pattern of damage on the optical disc.

20. The optical disc of claim 18 wherein the physically damaged portion comprises a plurality of sectors, some of which are damaged to create the pattern of damage on the optical disc.

21. The optical disc of claim 18 wherein the encrypted value marker is legible to a viewer.

22. A method of serializing an optical disc comprising the steps of:

physically damaging a portion of the optical disc to create a pattern of damage;

encoding the pattern of damage in a first value;

combining the first value with a second value to produce a combined value;

encrypting the combined value to produce an encrypted identifying value; and marking the optical disc with the encrypted identifying value to distinguish the optical disc from other optical discs.

23. The method of claim 18, further comprising the steps of:

requiring a user of the optical disc to provide the encrypted identifying value to an authenticator; and authenticating the encrypted identifying value by decrypting the encrypted identifying value provided by the user to extract the first value encoding the pattern of damage and comparing the extracted first value with a first value corresponding to the pattern of damage on the optical disc.

24. A method of serializing a plurality of optical discs comprising the steps of:

for each disc, selecting an identifying value that is different from the identifying values of other discs so as to distinguish the disc from other disc;

physically damaging a portion of the disc to create a pattern of damage that encodes the identifying value;

encrypting the identifying value; and marking the disc with the encrypted value.

25. A method of serializing an optical disc and authorizing a user of the optical disc comprising the steps of:

physically damaging a portion of the disc to create a pattern of damage;

encoding the pattern of damage in an identifying value to distinguish the disc from other discs;

encrypting the identifying value;

providing the disc with the encrypted value;

decrypting the encrypted value;

detecting by a disc reader the pattern of damage in the physically damaged portion of the disc; and authorizing the user of the disc when the detected pattern of damage corresponds to the decrypted value.

* * * * *

UNITED STATES PATENT AND TRADEMARK OFFICE
CERTIFICATE OF CORRECTION

PATENT NO.    :   5,572,589
DATED         :   November 5, 1996
INVENTOR(S)   :   Lester L. Waters et al.

It is certified that error appears in the above identified patent and that said Letters Patent is hereby corrected as shown below:

In column 8, claim 14, line 26, please delete "12" and insert therefor --10--.

Signed and Sealed this

Eighth Day of April, 1997

*Attest:*

BRUCE LEHMAN

*Attesting Officer*    *Commissioner of Patents and Trademarks*